(12) United States Patent
Alsayegh et al.

(10) Patent No.: US 12,216,038 B1
(45) Date of Patent: Feb. 4, 2025

(54) ADJUSTABLE CROSS-SECTIONAL AREA SAMPLE CONTAINER

(71) Applicant: KUWAIT UNIVERSITY, Safat (KW)

(72) Inventors: Naser Alsayegh, Bayan (KW); Nawaf F. Aljuwayhel, Surra (KW); Hessah Althallab, Granada (KW); Maryam Jamali, Abdullah Farwaniya (KW); Hessah H. Alhamdan, Surra (KW); Ali Alsayegh, Bayan (KW)

(73) Assignee: KUWAIT UNIVERSITY, Safat (KW)

( * ) Notice: Subject to any disclaimer, the term of this patent is extended or adjusted under 35 U.S.C. 154(b) by 0 days.

(21) Appl. No.: 18/434,415

(22) Filed: Feb. 6, 2024

(51) Int. Cl.
*G01N 21/51* (2006.01)
*G01N 15/0205* (2024.01)

(52) U.S. Cl.
CPC ......... *G01N 15/0211* (2013.01); *G01N 21/51* (2013.01); *G01N 2015/0222* (2013.01)

(58) Field of Classification Search
CPC .............. G01N 15/0211; G01N 21/51; G01N 2015/0222
USPC .................................................. 356/244, 246
See application file for complete search history.

(56) References Cited

U.S. PATENT DOCUMENTS

| | | | |
|---|---|---|---|
| 3,315,066 A | 4/1967 | Akinori et al. | |
| 3,377,597 A | 4/1968 | Akinori | |
| 3,695,765 A | 10/1972 | Bol et al. | |
| 4,283,143 A | 8/1981 | Patterson | |
| 4,609,991 A | 9/1986 | Minton et al. | |
| 4,697,925 A | 10/1987 | Hyodo et al. | |
| 6,219,138 B1 | 4/2001 | Swanson et al. | |
| 7,294,513 B2 | 11/2007 | Wyatt | |

(Continued)

FOREIGN PATENT DOCUMENTS

| CH | 637209 A5 | 7/1983 |
|---|---|---|
| DE | 3221867 A1 | 12/1983 |

OTHER PUBLICATIONS

Ali, Naser, Joao Amaral Teixeira, and Abdulmajid Addali. "New pH correlations for stainless steel 316L, alumina, and copper (I) oxide nanofluids fabricated at controlled sonication temperatures." Journal of Nano Research 58 (2019): 125-138.

(Continued)

*Primary Examiner* — Roy M Punnoose
(74) *Attorney, Agent, or Firm* — Nath, Goldberg & Meyer; Joshua B. Goldberg (57) ABSTRACT

A sample observation container and methods of use thereof are provided. The sample observation container includes a base and one or more sidewalls extending from the base. The one or more sidewalls form a sample enclosure for holding a sample undergoing a sample observation test such as sedimentation photographical capturing and dynamic light scattering, among other tests. The one or more sidewalls form a sample enclosure of adjustable cross-sectional area. The cross-sectional area may be adjusted by feeding or retracting a flexible sheet from a source roll to the sample enclosure. The cross-sectional area may further be adjusted by removing an innermost sidewall from among one or more nested sidewalls. The containers allow for physical adjustment of the cross-sectional area while performing subsequent sample observation tests, thereby allowing assessment of the effects of container size on the results of the sample, such as particles in liquid suspension.

18 Claims, 10 Drawing Sheets

(56) References Cited

U.S. PATENT DOCUMENTS

| | | | |
|---|---|---|---|
| 9,952,191 B2* | 4/2018 | Crisp | G01N 33/18 |
| 11,353,386 B1 | 6/2022 | Alsayegh et al. | |
| 2011/0192867 A1* | 8/2011 | Best | B65D 83/206 |
| | | | 222/402.13 |
| 2016/0153950 A1* | 6/2016 | Crisp | G01N 15/06 |
| | | | 382/128 |

OTHER PUBLICATIONS

Ali, Naser, Joao A. Teixeira, and Abdulmajid Addali. "Aluminium nanofluids stability: A comparison between the conventional two-step fabrication approach and the controlled sonication bath temperature method." Journal of Nanomaterials 2019 (2019): 1-9.

Ali, Naser, Joao A. Teixeira, and Abdulmajid Addali. "A review on nanofluids: fabrication, stability, and thermophysical properties." Journal of Nanomaterials 2018 (2018).

Almurtaji, Salah, et al. "On the role of nanofluids in thermal-hydraulic performance of heat exchangers-a review." Nanomaterials 10.4 (2020): 734.

Hwang, Yujin, et al. "Production and dispersion stability of nanoparticles in nanofluids." Powder Technology 186.2 (2008): 145-153.

* cited by examiner

ADJUSTABLE CROSS-SECTIONAL AREA SAMPLE CONTAINER

BACKGROUND

Field

The disclosure of the present patent application relates to containers for use in physical stability testing, and particularly to a container of adjustable cross-sectional area for use in physical stability testing.

Description of Related Art

Physical stability testing refers to a set of experiments and analyses conducted in a laboratory setting to assess the stability of a product, material, or formulation over time. Physical stability testing is commonly performed in various industries, including pharmaceuticals, cosmetics, food and beverages, and materials science. The primary goal is to understand how the physical characteristics of a product may change under different conditions, such as temperature, humidity, and time. This type of testing is crucial for ensuring the quality, safety, and efficacy of products.

Some key areas of physical stability testing include particle dispersion stability, emulsion stability, freeze-thaw stability, appearance and color stability, and impact of external factors such as light, oxygen, and humidity. Particle dispersion stability is an important factor of formulations containing particles or colloidal systems, in which stability tests assess the tendency of particles to aggregate, settle, or cream over time. Emulsion stability testing involves monitoring the separation of oil and water phases over time. Appearance and color stability refers to changes in color, odor, and appearance of a product which are monitored over time to ensure that the product maintains its desired characteristics.

In physical stability tests, especially those related to particle dispersion stability, the choice of container size (such as a vial, flask etc.) can play a role in the outcome of the test. Different sized vials can impact factors such as sedimentation rates, settling behavior, and particle interactions. Factors to consider regarding the size of container used in physical stability tests include sedimentation rates, surface-to-volume ratio, concentration effects, mixing and agitation, and applicability to real-world conditions.

Sedimentation rates refer to the rate at which particles settle in a suspension, and can be influenced by the size and shape of the container. In larger vials, there may be a greater distance for particles to settle, potentially affecting the observed sedimentation rates. The surface-to-volume ratio of the container can impact interactions between particles and container walls. Smaller containers with a higher surface-to-volume ratio may exhibit different particle-wall interactions compared to larger vials. The concentration of particles in suspension also can have effects on the stability of a suspension. Different size vials may result in different particle concentrations for the same amount of material. With regard to real-world conditions, consideration of the intended application of the material being tested can influence the size of the container to be used in physical stability testing, where an appropriately sized container should be used that is representative of the real world application.

Heretofore, containers used in physical stability tests such as particle dispersion stability are of fixed size and shape, requiring use of multiple containers of different size to observe differences in stability due to the container size. A need exists for a container in which different size dimensions may be used in a physical stability test to observe the effects on a sample medium as a result of changes in the container size.

Thus, a container solving the aforementioned problems is desired.

SUMMARY OF THE INVENTION

The physical stability analysis container provided by the present disclosure includes a base portion and one or more sidewalls extending from the base portion. The one or more sidewalls form a sample enclosure having a substantially uniform cross-sectional area with respect to an axis extending from the base. The cross-sectional area of the sample enclosure may be physically adjusted to a different substantially uniform cross sectional area with respect to an axis extending from the base. The one or more sidewalls forming the sample enclosure may be transparent or translucent.

In an embodiment, the one or more sidewalls of the sample enclosure are formed by a flexible sheet material that is fed from a source roll. The cross-sectional area of the sample enclosure is increased by rotating the source roll in a first direction to feed the flexible sheet material into the sample enclosure. The cross-sectional area is decreased by rotating the source roll in a second direction opposite to the first direction to retract the flexible sheet material from the sample enclosure.

For all embodiments of the containers described herein, the container may be used in a physical stability analysis test including one or more of sedimentation photographical capturing, dynamic light scattering, light transmittance and absorbance, zeta potential analysis, 3-ω approach, scanning electron microscopy analysis, transmitted electron microscopy characterization, spectral analysis, centrifugation, and particle size analysis.

In an embodiment, the physical stability analysis container having one or more sidewalls includes an outermost enclosed sidewall of curvilinear or polygonal shape fixedly attached to a base and one or more removable enclosed sidewalls of corresponding curvilinear or polygonal shape nested within the outermost enclosed sidewall. The innermost enclosed sidewall receives a sample medium and defines a sample enclosure. The cross-sectional area of the sample enclosure is adjusted by removing an innermost enclosed sidewall, causing the sample to be enclosed by the next closest sidewall of greater cross-sectional area.

In an embodiment, the one or more enclosed sidewalls of the physical stability analysis container include magnets. In particular, the enclosed sidewalls may include magnets along some or all of the base perimeter.

In another embodiment, the one or more enclosed sidewalls are joined through mating pins and cavities. In particular, the one or more enclosed sidewalls are joined though mating pins and cavities on the upper ends of the sidewalls.

In another embodiment, the one or more enclosed sidewalls of the physical stability analysis container include threads. In particular, the one or more sidewalls form nested enclosures that are mated by threading.

In an embodiment, a method for physical stability analysis is described, including providing a sample enclosure having a base and one or more sidewalls extending from the base. A particle suspension is introduced into the sample enclosure. A physical stability test is performed on the particle suspension within the enclosure, and a cross sectional area of the sample enclosure is adjusted with the particle suspension therein, wherein the cross-sectional area is substantially uniform with respect to an axis extending from the base of the sample enclosure.

In an embodiment, the method for physical stability analysis includes adjusting the cross-sectional area of the sample enclosure by rotating a source roll in a first direction. Rotating the source roll in a first direction feeds a flexible material from the source roll to the sample enclosure thereby increasing the cross-sectional area of the sample enclosure. Rotating the source roll in a second direction opposite the first direction retracts the flexible material, thereby decreasing the cross-sectional area of the sample enclosure.

In an embodiment, the method of physical stability analysis includes a physical stability test including from one or more of sedimentation photographical capturing, dynamic light scattering, light transmittance and absorbance, zeta potential analysis, 3-ω approach, scanning electron microscopy analysis, transmitted electron microscopy characterization, spectral analysis, centrifugation, and particles size analysis.

In another embodiment, the method for physical stability analysis includes adjusting the cross-sectional area by removing one or more nested sidewall enclosures. In particular, the cross-section area is adjusted by removing an innermost sidewall enclosure.

In an embodiment, the method of physical stability analysis includes one or more nested sidewall enclosures containing magnets. In particular, the nested sidewall enclosures may include a magnet along some or all of a base perimeter.

In an embodiment, the method of physical stability analysis includes one or more nested sidewall enclosures joined by mating pins and cavities. In particular, the one or more nested sidewall enclosures are joined though mating pins and cavities on the upper ends of the sidewalls.

In an embodiment, the method of physical stability analysis includes one or more nested sidewall enclosures having threads. In particular, the one or more nested sidewall enclosures are mated by corresponding threads placed on inner and outer surfaces of the sidewalls.

In another embodiment, a method for physical stability analysis is provided including providing a sample enclosure having a base and one or more sidewalls extending from the base. A particle suspension is introduced into the sample enclosure. A physical stability test is performed on the particle suspension from among the group of sedimentation photographical capturing, dynamic light scattering, light transmittance and absorbance, zeta potential analysis, 3-ω approach, scanning electron microscopy analysis, transmitted electron microscopy characterization, spectral analysis, centrifugation, and particles size analysis. A cross sectional area of the sample enclosure is adjusted with the particle suspension therein. The cross-sectional area of the sample enclosure is substantially uniform with respect to an axis perpendicular to the base of the sample enclosure. The physical stability test previously performed is then repeated on the sample enclosure of adjusted, substantially uniform cross-sectional area.

These and other features of the present subject matter will become readily apparent upon further review of the following specification.

BRIEF DESCRIPTION OF DRAWINGS

Similar reference characters denote corresponding features consistently throughout the attached drawings.

DETAILED DESCRIPTION

Figure 1A:
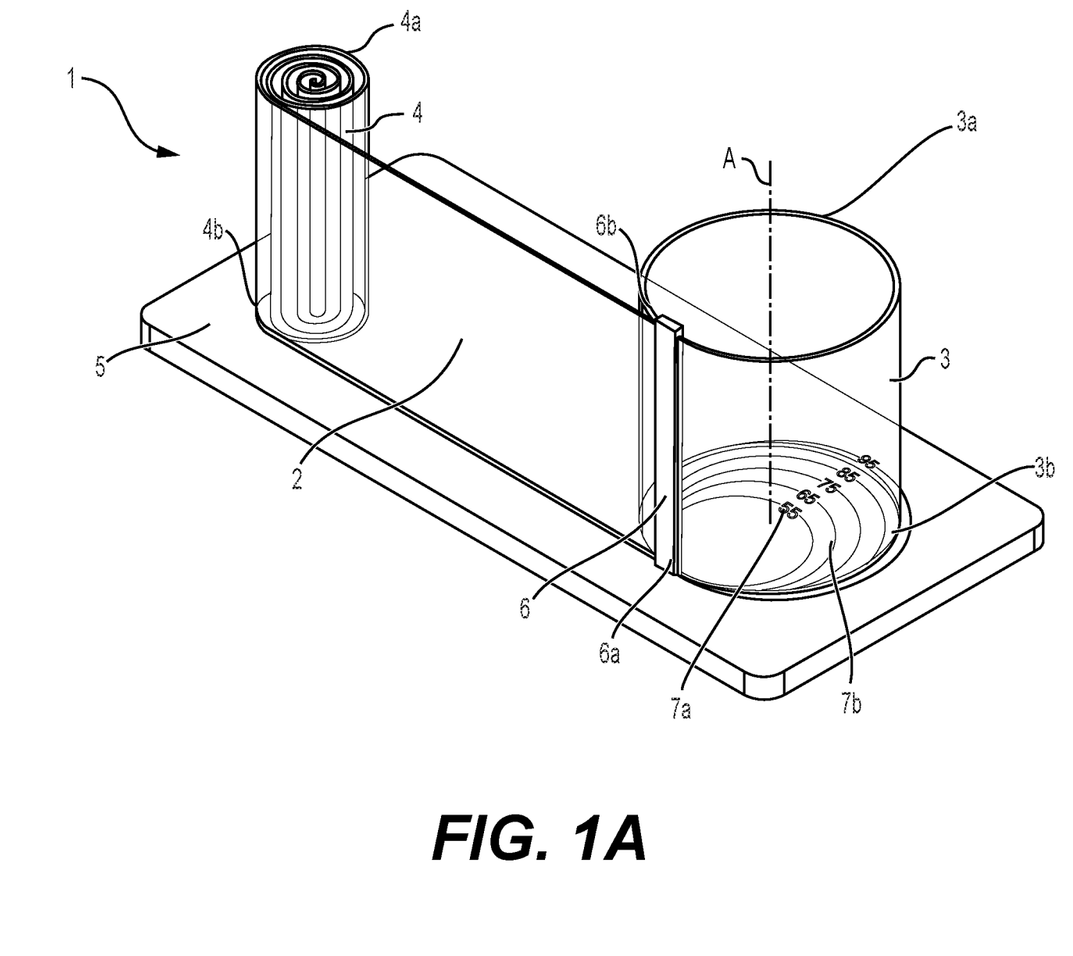
FIG. 1A is perspective view of a first embodiment of a physical stability analysis container.
Figure 1B:
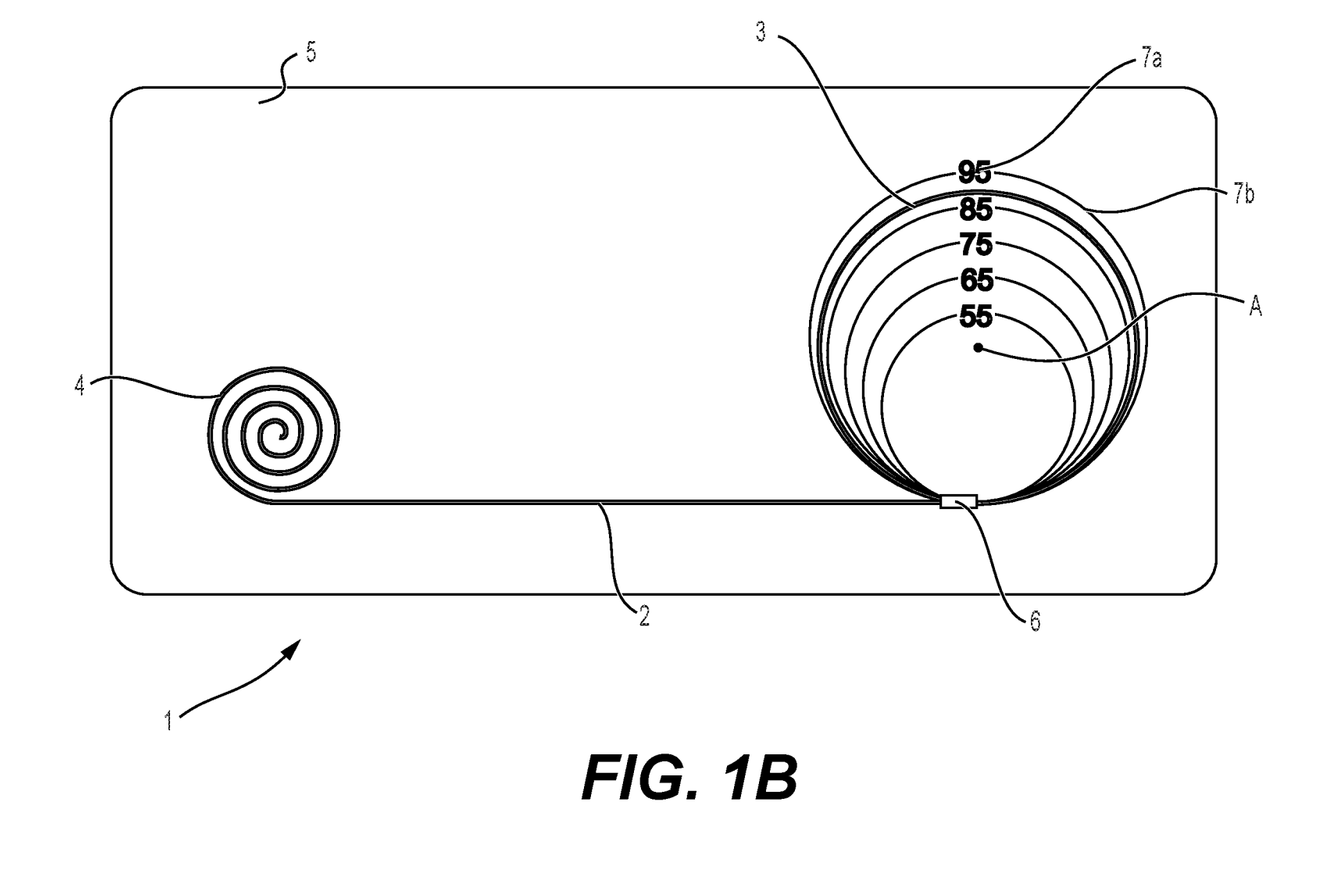
FIG. 1B is a top view of a first embodiment of a physical stability analysis container.

In FIGS. 1A and 1B, a first embodiment of the physical stability analysis container 1 is shown, including a flexible sheet 2 which may be made of an elastic, transparent material. In particular non-limiting examples, flexible sheet 2 may be formed of borosilicate glass, plastic (polymers), or perfluoroalkoxy (PFA). Container 1 further includes a sample enclosure 3 having an upper rim 3a and lower rim 3b. In the non-limiting embodiment shown, sample enclosure 3 is formed by a single cylindrical sidewall made up of flexible sheet 2 which is fed from a source roll 4. Source roll 4 includes an upper rim 4a and a lower rim 4b. Both sample enclosure 3 and source roll 4 extend vertically from a base 5 and are in contact with base 5 along their respective lower rims 3b, 4b.

Sample enclosure 3 is sealed by a square shaped gasket that is adjusted to a C-shaped stainless-steel plate 6 that is fixed vertically on the outside of the vial cavity to form a guide slot 6a for the flexible sheet 2 to pass through. The end of flexible sheet 2 will be fixed on one of the inner surfaces 6b of the gasket after passing through the slot 6a.

As shown in FIG. 1B, the sample enclosure 3 is uniform in cross section with respect to an axis A extending perpendicular from base 5. Although the sample enclosure is shown in the shape of a cylinder having a circular cross section, other shapes are conceivable for the cross section of sample enclosure 3 including elliptical, curvilinear, or a combination of curvilinear (i.e. curved lines) and polygonal (i.e. straight lines).

As shown in FIG. 1A and FIG. 1B, sample enclosure 3 is configured to be adjustable in diameter and cross-sectional area. Numerical markings 7a and lines 7b indicate adjustments in diameter which may be made to sample enclosure 3. The cross-sectional area of the sample enclosure 3 is configured to be increased by rotating the source roll 4 in a first direction, such as counter-clockwise, to feed more of the flexible sheet material into the sample enclosure. The cross-sectional area is decreased by rotating the source roll 4 in a second direction opposite to the first direction, such as clockwise, to retract the flexible sheet 2 from the sample enclosure 3. Rotation of the source roll 4 can be accomplished by any suitable means such as a shaft and gear arrangement (not shown), or by manually gripping and rotating the source roll 4.

To prevent leakage from the sample enclosure 3, a sealing material such as clay may be used at the bottom of the outer surface 3b. Alternatively, a gasket material can be added to the bottom of the flexible sheet 2. Also, the bottom surface of flexible sheet 2 can be coated with metallic nanoparticles, after which a magnet can be placed below base 5 to secure its required final form. In any case, a user will have the capability to modify the cross-sectional area of the sample enclosure 3, based on their requirements and targeted sample suspension by adding or retracting the flexible sheet 2.

Figures 2A, 2B:
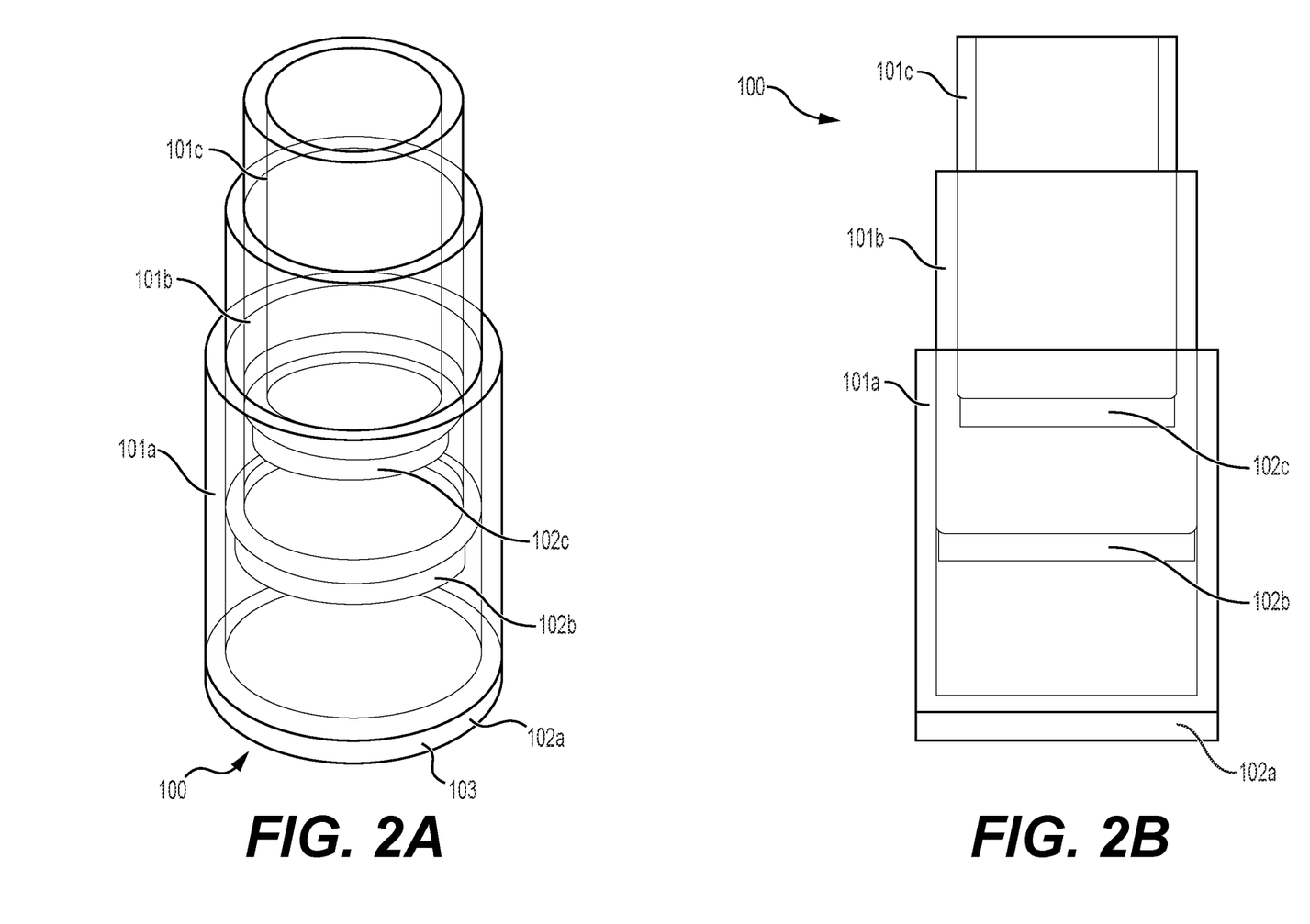
FIG. 2A is a perspective view of a second embodiment of a physical stability analysis container.
FIG. 2B is a side view of a second embodiment of a physical stability analysis container in expanded state.
Figure 2C:
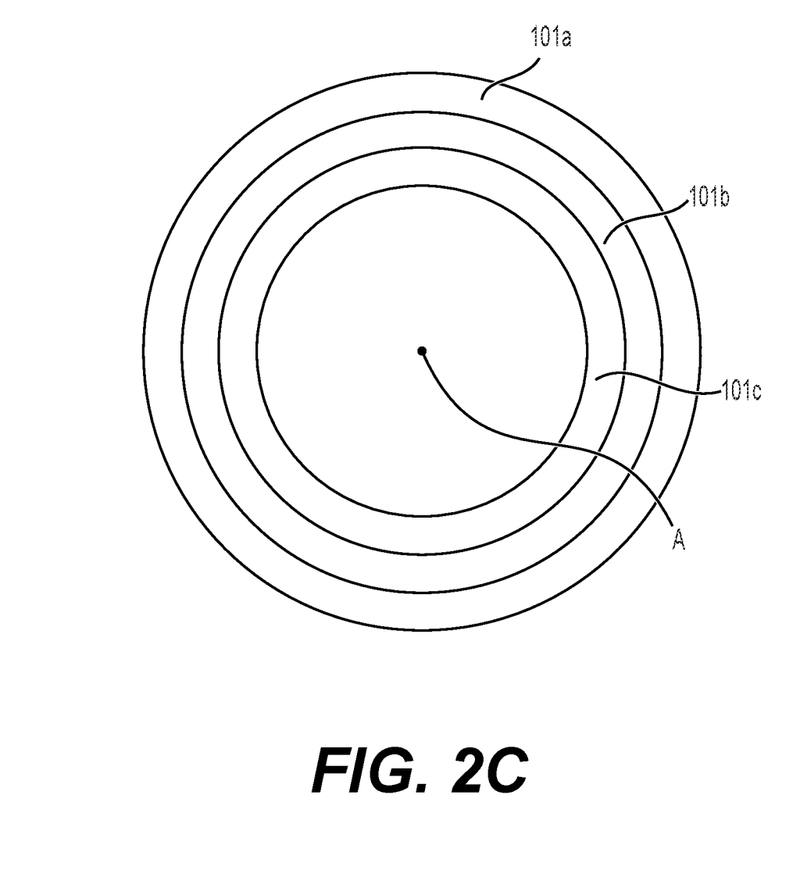
FIG. 2C is a top view of a second embodiment of a physical stability analysis container.

In a second embodiment, shown in FIGS. 2A-D a physical stability analysis container 100 includes three nested cylindrical sidewalls 101a, 101b, 101c extending from a base 103 of the outermost sidewall 101a. Outermost sidewall 101a is fixedly attached to a base 103 while the nested inner sidewalls 101b, 101c are open ended and removable. The innermost sidewall 101c defines a sample enclosure into which is placed a particle suspension or other sample to be tested. As shown in FIG. 2C, sidewalls 101a-c are of uniform cross section with respect to an axis A extending perpendicularly from base 103. Although the sidewalls 101a-c are shown as nested cylinders of circular cross section, other shapes are conceivable for the cross section of the sidewalls including elliptical, curvilinear, or a combination of curvilinear (i.e. curved lines) and polygonal (i.e. straight lines).

To adjust the cross-sectional area of the sample enclosure, innermost sidewall 101c is configured to be removed thereby causing the particle suspension or sample to settle within the next available sidewall 101b which then defines the new sample enclosure of adjusted cross-sectional area. The procedure may be repeated by removing sidewall 101b to allow the particle suspension or sample to settle within sidewall 101a.

Figure 2D:
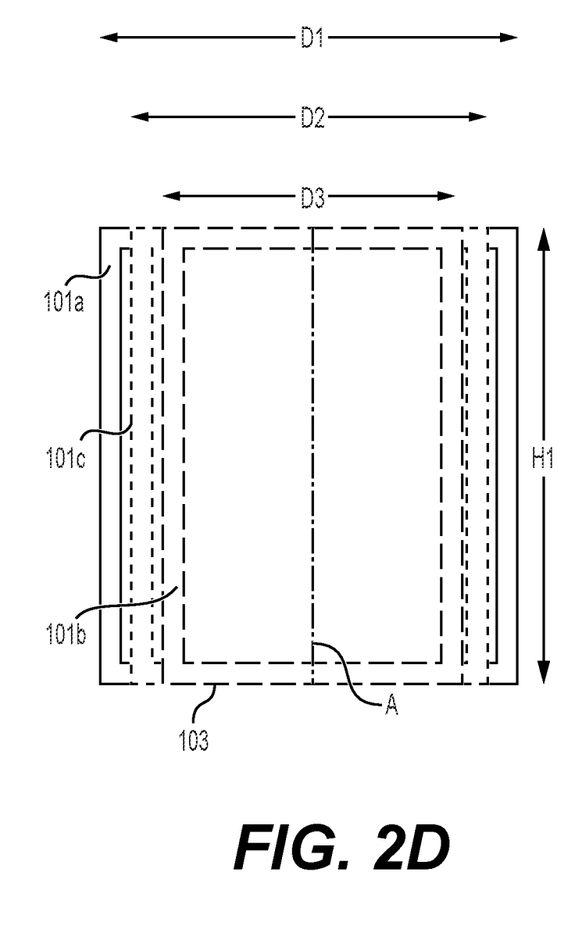
FIG. 2D is a side view of a second embodiment of a physical stability analysis container in a normal compact state.

It should be noted that FIG. 2A and FIG. 2B depict container 100 in an expanded state for illustration purposes and that during normal usage the sidewalls 101a-c are in a compact nested state as shown in FIG. 2D. As seen in FIG. 2D, sidewalls 101a-c contain different respective diameters D1, D2, D3 but are of uniform height H1.

Similarly to the previous embodiment, container 100 may be sealed by a material such as clay on the bottom surfaces of sidewalls 101a-c. Alternatively, the bottom of sidewalls 101a-c may have a ring shaped gasket material placed thereon or be coated with metallic nanoparticles, after which a magnet can be placed below base 103 to secure sidewalls 101a-c. Furthermore, the bottom rims of cylindrical sidewalls 101a-c may be partially or fully covered by magnets 102a-c. Magnets 102a-c may serve to secure sidewalls 101a-c in place.

FIGS. 3A-D show a third embodiment of a container 200 used for physical stability testing. Similarly to the previous embodiment, container 200 contains nested cylindrical sidewalls 201a-c of substantially uniform cross-section with respect to an axis extending from base 203. Container 200 has only a minor variation in cross-section resulting from the shown mating arrangement of pins 203 and cavities 202. However, it should be understood, that by the term 'substantially uniform' as used in the present disclosure with regards to cross-sectional shape and size, this term is defined herein as a singular cross sectional shape and size existing along the length of the sidewalls, without tapering or conical variations in cross section but only minor variations due to any mating arrangements between the sidewalls such as protruding pegs, threads, magnets, or other mating arrangements used on the base, sides, or upper rims of the nested sidewalls. An example of shapes that would not be 'substantially uniform' in cross section as defined herein would include cones, pyramids, or other tapered shapes. Examples of shapes that are 'substantially uniform' in cross section would include cylinders, semi-cylinders, cubes, or other shapes having uniform cross sectional dimensions along their length with only minor variations permitted due to any mating arrangements or small protrusions, grooves, etc. such as those already described.

Figures 3A, 3B:
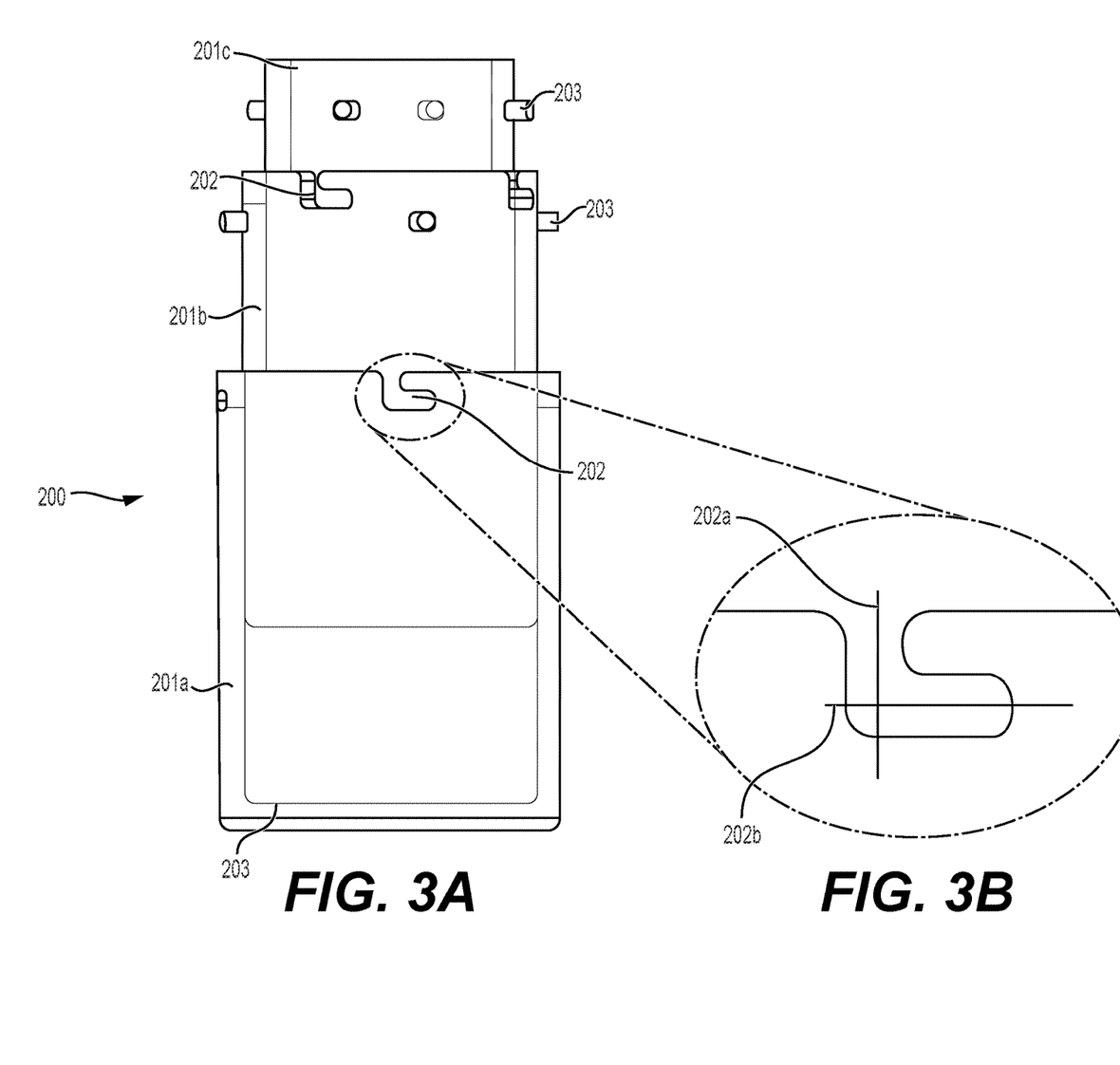
FIG. 3A is a side view of a third embodiment of a physical stability analysis container in an expanded state.
FIG. 3B is a magnified side view of a mating cavity.
Figure 3C:
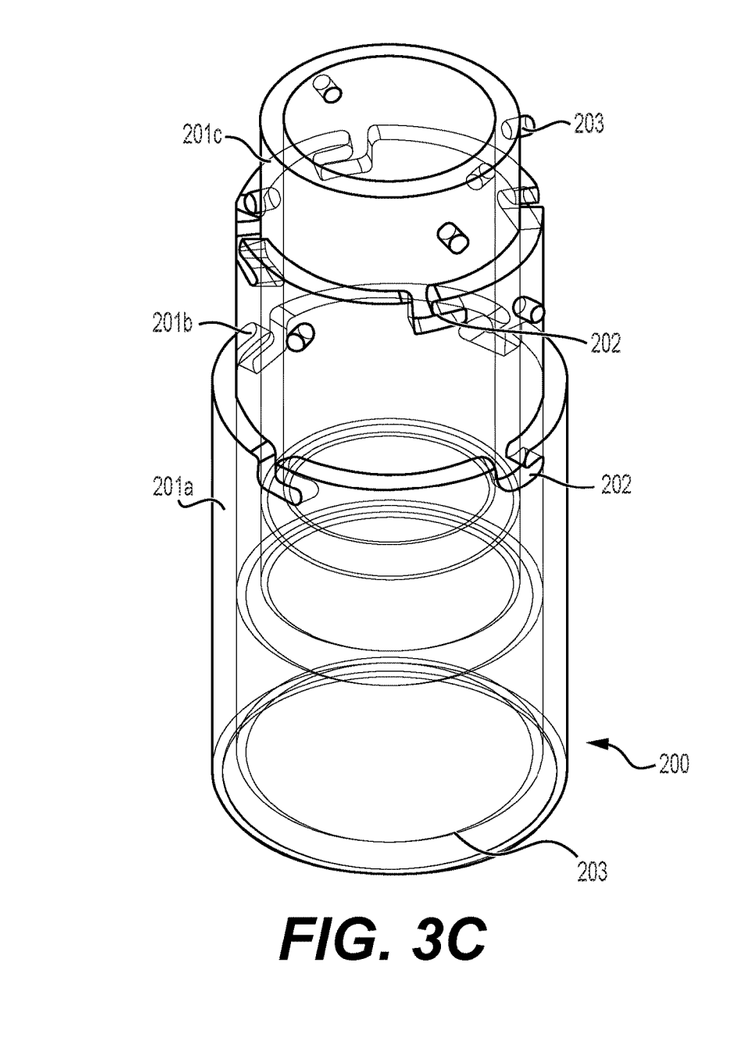
FIG. 3C is a perspective view of a third embodiment of a physical stability analysis container in an expanded state.
Figure 3D:
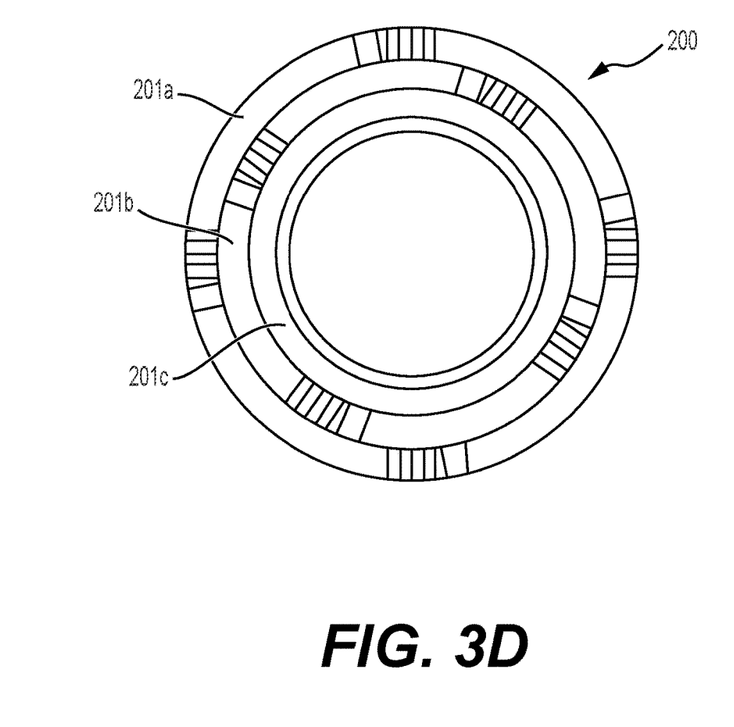
FIG. 3D is a top view of a third embodiment of a physical stability analysis container.

As a non-limiting example of a minor variation in cross section, while still conforming to the definition of 'substantially uniform' in cross-section as defined herein, reference is made to pins 203 and cavities 202 used for joining sidewalls 201a-c of container 200. Pins 203 are shown on the outer surface of sidewalls 201a-c and fit within corresponding cavities 202 of a mating sidewall. Cavities 202 may be in any suitable shape, but in particular may be L-shaped as shown in FIG. 3B, with a vertical portion 202a and horizontal portion 202b.

Similar sealing solutions may be provided on bottom surfaces of sidewalls 201a-c as previously described, including clay material, ring-shaped gaskets corresponding to the sidewall cross section, or a magnetic nanoparticle coating. Furthermore, as in previous embodiments, other shapes may be used rather than cylindrical sidewalls such as curvilinear shapes, polygonal shapes, or shapes using a combination of straight and curved surfaces or lines, provided that the enclosed sidewalls defined by the shape are of uniform or substantially uniform cross section along the length of the sidewall, with the only minor variations in cross section due to, for example. mating interfaces between the sidewalls.

Figure 4A:
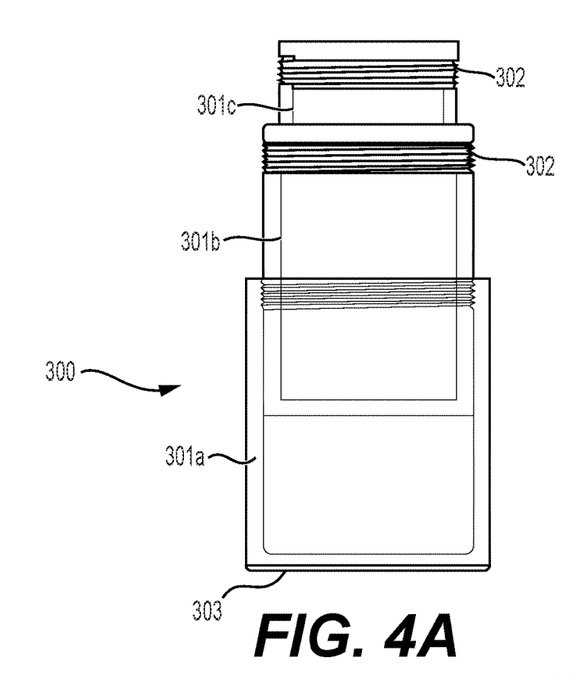
FIG. 4A is a side view of a fourth embodiment of a physical stability analysis container.
Figure 4B:
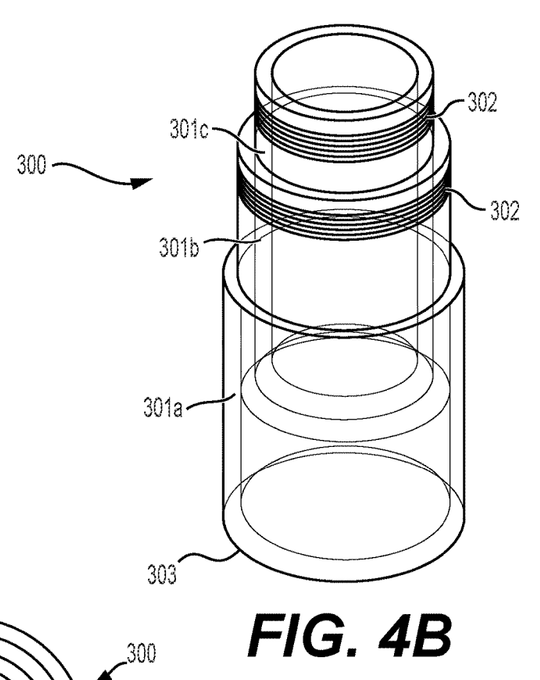
FIG. 4B is a perspective view of a fourth embodiment of a physical stability analysis container.
Figure 4C:
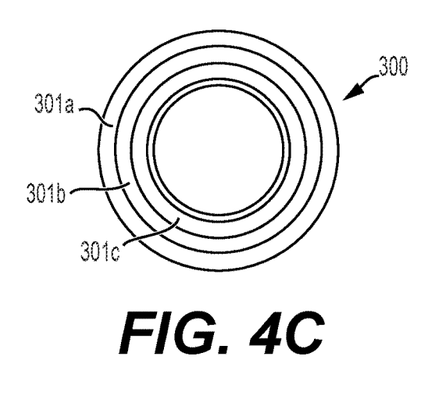
FIG. 4C is a top view of a fourth embodiment of a physical stability analysis container.

FIGS. 4A-C show a fourth embodiment of a physical stability analysis container 300 including cylindrical sidewalls 301a-c extending from a base 303 which is fixedly attached to outermost sidewall 301a. As in the previous two embodiments, only the outermost cylindrical sidewall is fixedly attached to the base 303, while the nested inner sidewalls are unattached and removable. The sidewalls are substantially uniform in cross section wile containing a threaded mating arrangement shown by threads 302.

Figure 5A:
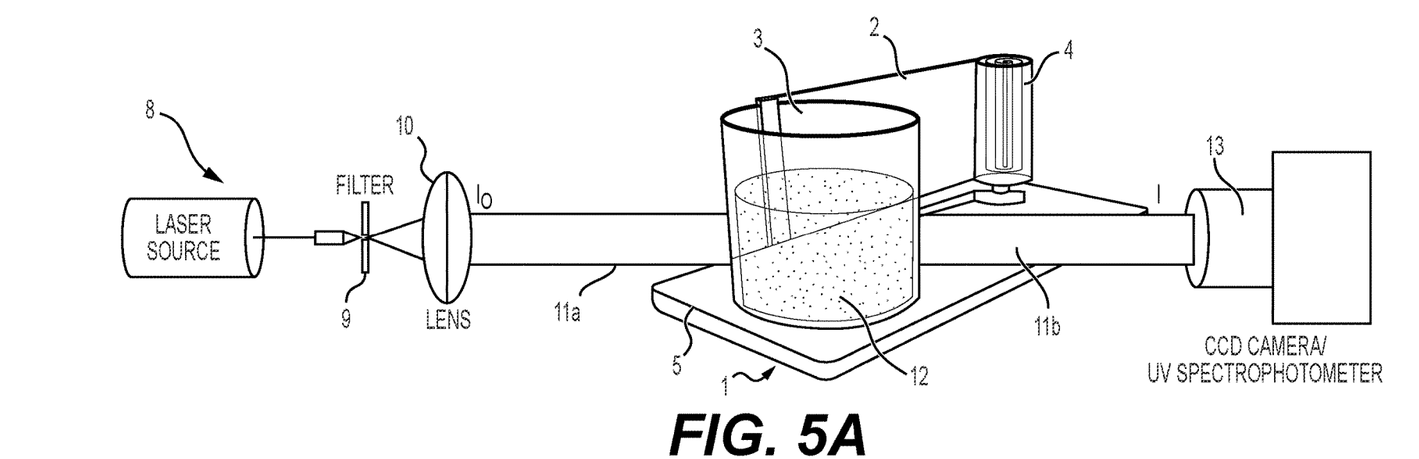
FIG. 5A is an environmental perspective view of a first embodiment of a physical stability container used in a transmittance and absorbance measurement test.

Turning to FIG. 5A, physical stability analysis container 1 is shown in a particle dispersion stability test, namely a light transmission and absorption test. Testing the amount of light transmitted and absorbed by a sample is a useful indicator with regards to the stability and dispersion of particles within the sample, as well as the composition of particles within a sample.

The elements of the light transmission and absorption test include a laser source 8, filter 9, lens 10, and charge coupled device (CCD) 13. Laser source 8 provides a focused beam of light 11, shown as a first section 11a between laser source 8 and container 1, and a second section 11b that has passed through container 1 and enters CCD 13. CCD 13 may be any suitable image sensor used to analyze characteristics such as particle size, distribution and concentration. In particular CCD 13 may be a CCD camera or a UV spectrophotometer. Lens 10 serves to focus light 11 onto the sample within container 1 as well as towards CCD 13, which captures and measures the intensity of the transmitted or absorbed light, which can be analyzed to infer particle size, concentration, and the degree of stability or aggregation in a sample.

Figure 5B:
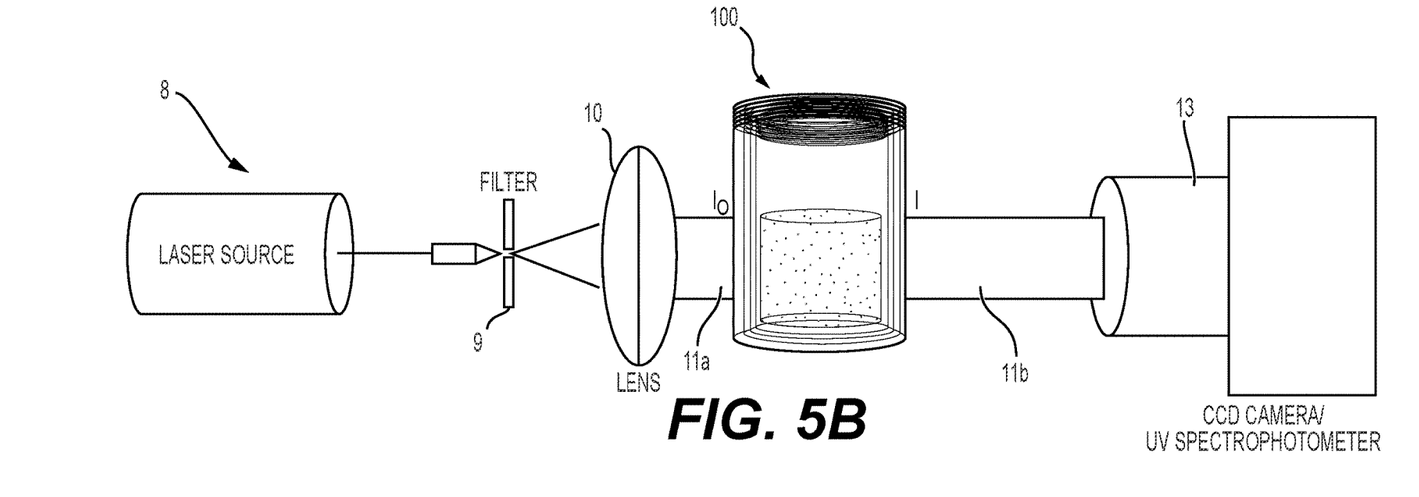
FIG. 5B is an environmental perspective view of a second embodiment of a physical stability container used in a transmittance and absorbance measurement test.

FIG. 5B shows an embodiment of container 100 used in a light transmission and absorbance test. In order to use container 100 for a light transmission and absorbance test, it would be necessary to conduct a reference measurement using the base fluid absent of suspended particles in the same configuration to be used when container 100 contains a particle suspension sample. Taking such a reference measurement accounts for changes in refractive index of the multiple sidewalls used in container 100.

Figure 6A:
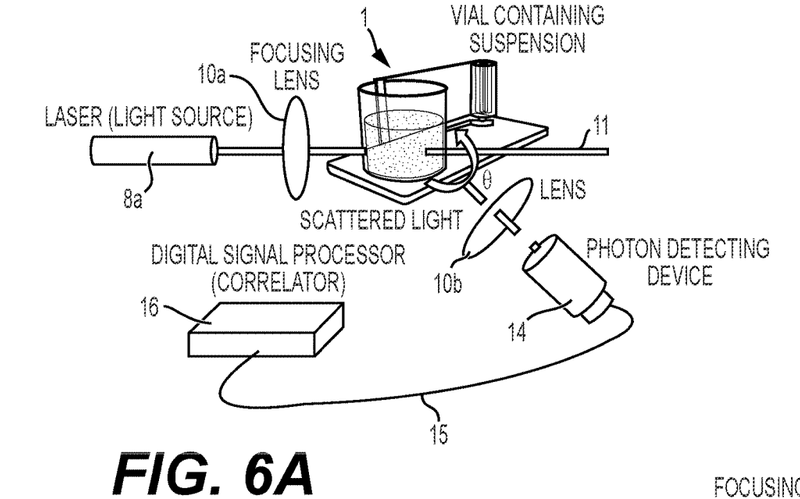
FIG. 6A is an environmental perspective view of a first embodiment of a physical stability container used in a dynamic light scattering test.

FIG. 6A shows an embodiment of container 1 used in a dynamic light scattering test. The components of the dynamic light scattering test include laser light source 8a, focusing lenses 10a, 10b, photon detector 14 and digital signal processor (DSP) 16. Photon detector 14 serves to detect scattered light 11 passing through lenses 10a, 10b and container 1 that result from the Brownian motion of particles in a sample. Brownian motion refers to the random and continuous movement of particles suspended in a fluid as a result of their collisions with surrounding molecules. As particles undergo Brownian motion in a solution, they create fluctuations in the scattered light. DSP 16 serves to process electrical signals passed along wiring 15 by photon detector 14. DSP 16 analyzes the intensity fluctuations in the scattered light over time and performs calculations to extract information about the size distribution and dynamics of the particles in the suspension sample.

Figure 6B:
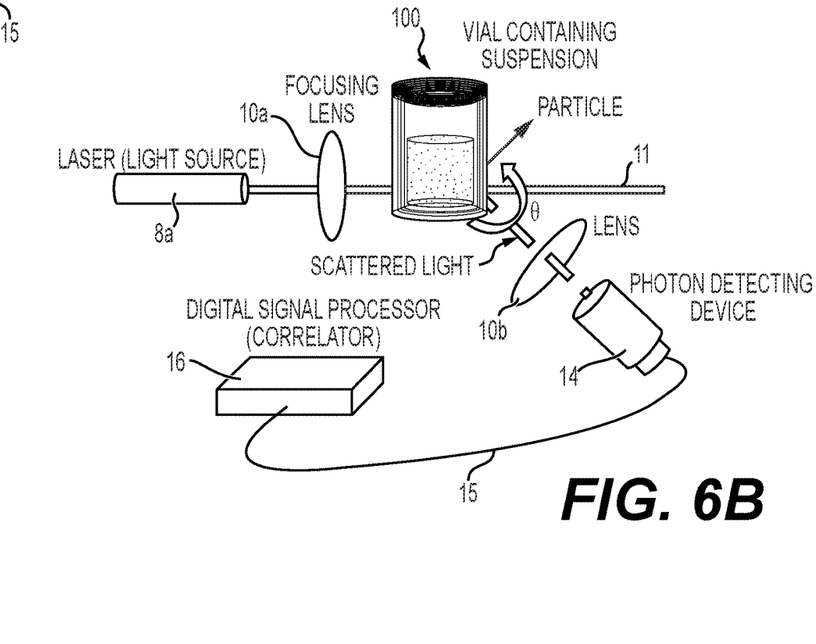
FIG. 6B is an environmental perspective view of a second embodiment of a physical stability container used in a dynamic light scattering test.

FIG. 6B shows an embodiment of container 100 used in a dynamic light scattering test. Similarly to the light transmission and absorbance test conducted with container 100, it would be necessary for the dynamic light scattering test of FIG. 6B to conduct a reference measurement using the base fluid absent of suspended particles. By conducting a reference measurement, changes in refractive index of the multiple sidewalls used in container 100 may be accounted for in the dynamic light scattering test.

Figure 7A:
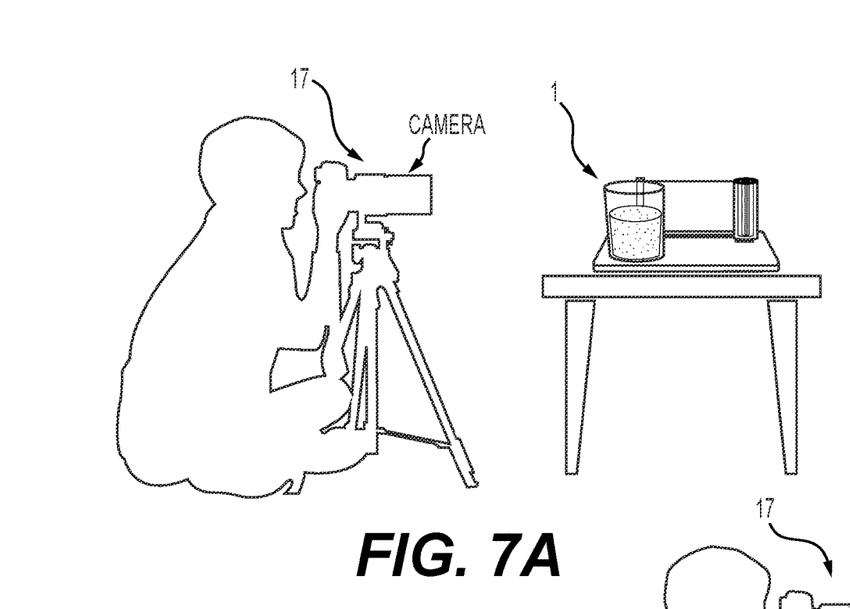
FIG. 7A is an environmental perspective view of a first embodiment of a physical stability container used in a sedimentation photographical capturing method.
Figure 7B:
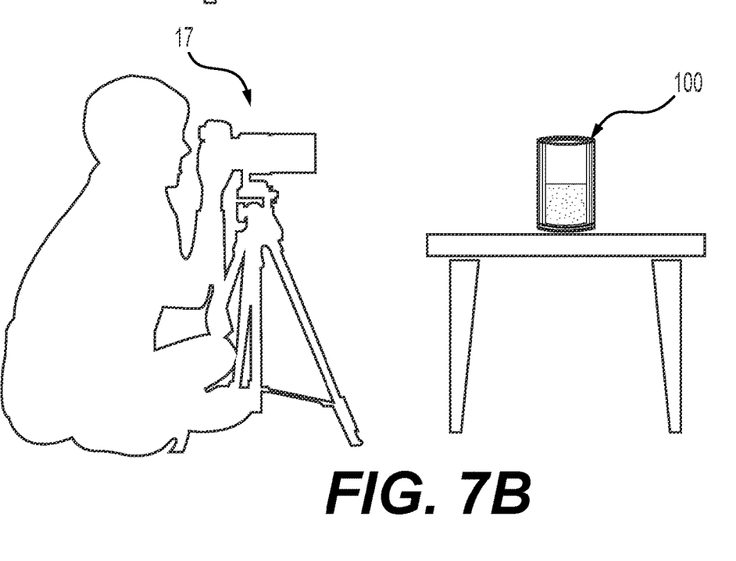
FIG. 7B is an environmental perspective view of a second embodiment of a physical stability container used in a sedimentation photographical capturing method.

FIGS. 7A and 7B show examples of a sedimentation photographical capturing test using containers 1 and 100, respectively. The sedimentation photographic capturing test involves visually capturing images or photographs of particles settling or sedimenting in a liquid. Photographs or images of the sedimentation process are captured at regular intervals using a camera 17 or other imaging equipment. The frequency of image capture depends on the expected settling rate of the particles and the duration of the test. The captured images are then analyzed to observe and measure the settling behavior of the particles. Key parameters that may be assessed include the settling rate, the formation of sediment layers, the extent of aggregation or flocculation, and the overall stability of the system.

Although specific reference has been made to sedimentation photographical capturing, light transmittance and absorbance testing as well as dynamic light scattering, the containers described herein may be used in any test where changes in size of the container may influence the outcome of the test. Examples of other tests may include zeta potential analysis, 3-ω approach, scanning electron microscopy analysis, transmitted electron microscopy characterization, spectral analysis, centrifugation, and particle size analysis.

By using the containers of adjustable size as set forth and described herein, physical stability analysis testing may be performed on a prepared particle suspension sample without the need for replacing the container with a new container of different size, but rather by simply making a physical adjustment of the container to thereby increase or decrease the size of the sample enclosure. In doing so, test procedures may be repeatedly performed using the same container at multiple sizes to observe the role of container size on the outcome of the test.

It is to be understood that the containers for physical stability analysis and methods of use thereof are not limited to the specific embodiments described above, but encompass any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A sample observation container comprising:
   a base portion;
   one or more sidewalls extending from the base portion, the one or more sidewalls forming a sample enclosure having a substantially uniform cross-sectional area with respect to an axis extending perpendicular from the base, and wherein the cross-sectional area of the sample enclosure is configured to be physically adjusted to a new substantially uniform cross-sectional area with respect to an axis extending from the base.

2. The sample observation container as recited in claim 1, wherein one or more of the sidewalls forming the sample enclosure are transparent or translucent.

3. The sample observation container as recited in claim 2, wherein one or more of the sidewalls are formed by a flexible sheet material fed from a source roll.

4. The sample observation container as recited in claim 3, wherein the cross-sectional area is configured to be increased by rotating the source roll in a first direction thereby feeding the flexible sheet material to the sample enclosure, and the cross-sectional area is configured to be decreased by rotating the source roll in a second direction opposite to the first direction thereby retracting the flexible sheet material from the sample enclosure.

5. The sample observation container as recited in claim 2, wherein the one or more sidewalls include an outermost enclosed sidewall of curvilinear or polygonal shape fixedly attached to the base and one or more removable enclosed sidewalls of corresponding curvilinear or polygonal shape nested within the outermost enclosed sidewall, and wherein the sample enclosure is defined by an innermost enclosed sidewall.

6. The sample observation container as recited in claim 5, wherein the cross-sectional area of the sample enclosure is changed by removing an innermost enclosed sidewall.

7. The sample observation container as recited in claim 5, wherein the one or more enclosed sidewalls comprise magnets.

8. The sample observation container as recited in claim 5, wherein the one or more enclosed sidewalls are joined though mating pins and cavities.

9. The sample observation container as recited in claim 5, wherein the one or more enclosed sidewalls are threaded.

10. A method of sample observation comprising:
providing a sample enclosure having a base and one or more sidewalls extending from the base;
introducing a particle suspension into the sample enclosure;
performing sample observation on the particle suspension within the enclosure; and
adjusting a cross-sectional area of the sample enclosure with the particle suspension therein, wherein the cross-sectional area is substantially uniform with respect to an axis extending from the base of the sample enclosure.

11. The method of sample observation as recited in claim 10, wherein adjusting the cross-sectional area of the sample enclosure includes rotating a source roll in a first direction to feed a flexible material from the source roll to the sample enclosure thereby increasing the cross-sectional area of the sample enclosure, and rotating the source roll in a second direction opposite the first direction to retract the flexible material thereby decreasing the cross-sectional area of the sample enclosure.

12. The method of sample observation as recited in claim 11, wherein the method includes one or more of sedimentation photographical capturing, dynamic light scattering, light transmittance and absorbance, zeta potential analysis, 3-ω approach, scanning electron microscopy analysis, transmitted electron microscopy characterization, spectral analysis, centrifugation, and particles size analysis.

13. The method of sample observation as recited in claim 10, wherein adjusting the cross-sectional area includes removing an innermost nested sidewall.

14. The method of sample observation as recited in claim 13, wherein the method includes one or more of sedimentation photographical capturing, dynamic light scattering, light transmittance and absorbance, zeta potential analysis, 3-ω approach, scanning electron microscopy analysis, transmitted electron microscopy characterization, spectral analysis, centrifugation, and particles size analysis.

15. The method of sample observation as recited in claim 13, wherein one or more of the nested sidewalls comprise magnets.

16. The method of sample observation as recited in claim 13, wherein one or more nested sidewalls are joined though mating pins and cavities.

17. The method of sample observation as recited in claim 13, wherein one or more nested sidewalls are threaded.

18. A method of sample observation comprising:
providing a sample enclosure having a base and one or more sidewalls extending from the base;
introducing a particle suspension into the sample enclosure;
performing a sample observation on the particle suspension within the enclosure from among the group of sedimentation photographical capturing, dynamic light scattering, light transmittance and absorbance, zeta potential analysis, 3-ω approach, scanning electron microscopy analysis, transmitted electron microscopy characterization, spectral analysis, centrifugation, and particles size analysis;
adjusting a cross sectional area of the sample enclosure with the particle suspension therein, wherein the cross-sectional area of the sample enclosure is substantially uniform with respect to an axis perpendicular to the base of the sample enclosure; and
repeating the sample observation previously performed on the sample enclosure of adjusted, substantially uniform cross-sectional area.

* * * * *